(12) United States Patent
Silva et al.

(10) Patent No.: US 11,960,284 B2
(45) Date of Patent: Apr. 16, 2024

(54) MULTIPOINT CABLE CAM SYSTEM AND METHOD

(71) Applicant: GoPro, Inc., San Mateo, CA (US)

(72) Inventors: William Silva, San Francisco, CA (US); Vikrant More, San Mateo, CA (US); Ashwani Arya, Encinitas, CA (US); Mehran Ferdowsi, Foster City, CA (US); Stephen Yui, Pacifica, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/096,238

(22) Filed: Jan. 12, 2023

(65) Prior Publication Data

US 2023/0168676 A1 Jun. 1, 2023

Related U.S. Application Data

(63) Continuation of application No. 17/521,541, filed on Nov. 8, 2021, now Pat. No. 11,556,129, which is a continuation of application No. 15/906,716, filed on Feb. 27, 2018, now Pat. No. 11,169,522.

(60) Provisional application No. 62/564,426, filed on Sep. 28, 2017.

(51) Int. Cl.
| | |
|---|---|
| *B64D 47/08* | (2006.01) |
| *B64C 39/02* | (2023.01) |
| *G05D 1/00* | (2006.01) |
| *B64U 10/13* | (2023.01) |
| *B64U 30/20* | (2023.01) |
| *G01S 19/48* | (2010.01) |
| *H04N 23/661* | (2023.01) |
| *H04N 23/68* | (2023.01) |

(52) U.S. Cl.
CPC ......... *G05D 1/0202* (2013.01); *B64C 39/024* (2013.01); *B64D 47/08* (2013.01); *G05D 1/0094* (2013.01); *B64U 10/13* (2023.01); *B64U 30/20* (2023.01); *B64U 2201/20* (2023.01); *G01S 19/48* (2013.01); *H04N 23/661* (2023.01); *H04N 23/685* (2023.01)

(58) Field of Classification Search
CPC .. G05D 1/0202; G05D 1/0094; B64C 39/024; B64D 47/08; H04N 23/661; H04N 23/685; B64U 10/13; B64U 2201/20; B64U 30/20; G01S 19/48
See application file for complete search history.

(56) References Cited

U.S. PATENT DOCUMENTS

| | | |
|---|---|---|
| 6,813,559 B1 | 11/2004 | Bodin |
| 10,602,098 B2 | 3/2020 | Smolyanskiy |
| 11,169,522 B2 | 11/2021 | Silva |
| 11,556,129 B2 | 1/2023 | Silva |

(Continued)

*Primary Examiner* — Mathew Franklin Gordon
(74) *Attorney, Agent, or Firm* — Young Basile Hanlon & MacFarlane, P.C.

(57) ABSTRACT

This disclosure describes a method of controlling an unmanned aerial vehicle (UAV). The steps of controlling include acquiring images with an image capture device of an unmanned aerial vehicle (UAV). The steps include analyzing the images to determine navigation information of the UAV with a vision-based navigation system. The steps include tracking a position of the UAV with the vision-based navigation system. The steps include controlling rotors of the UAV to prevent deviations in movement from a desired flight path or position of the UAV. The steps include limiting travel or flight of the UAV to a physical region determined by the desired flight path.

20 Claims, 9 Drawing Sheets

(56) References Cited

U.S. PATENT DOCUMENTS

| | | |
|---|---|---|
| 2006/0022833 A1 | 2/2006 | Ferguson |
| 2014/0166816 A1 | 6/2014 | Levien |
| 2018/0002010 A1 | 1/2018 | Bauer |
| 2018/0293898 A1 | 10/2018 | Redmann |
| 2018/0357909 A1 | 12/2018 | Eyhorn |
| 2018/0373269 A1 | 12/2018 | Cantrell |
| 2019/0094863 A1 | 3/2019 | Silva |
| 2022/0066450 A1 | 3/2022 | Silva |

MULTIPOINT CABLE CAM SYSTEM AND METHOD

CROSS REFERENCE TO RELATED APPLICATIONS

This application is a continuation of U.S. patent application Ser. No. 17/521,541, filed Nov. 8, 2021, which is a continuation of U.S. patent application Ser. No. 15/906,716, filed Feb. 27, 2018, now U.S. Pat. No. 11,169,522, which claims the benefit of U.S. Provisional Application No. 62/564,426, filed Sep. 28, 2017, the contents of which are incorporated by reference herein in their entirety.

TECHNICAL FIELD

This disclosure relates to Unmanned Aerial Vehicles (UAVs) and flight control systems therefor and, more particularly, a multipoint cable cam (MPCC) system and method.

BACKGROUND

For aerial photography, a user may know the path to be taken in advance. Knowing the path in advance, the user can plan an autonomous flight path that will control the UAV location, speed, yaw angle, gimbal tilt, and pause location. Typical UAV cable cam systems are limited to a maximum of ten waypoints. In addition, typical UAV cable cam features do not provide smooth, continuous, cinematic footage and merely perform sequential waypoint-to-waypoint missions with discontinuous linear tweening between keyframes resulting in undesirable footage. Five-axis flight and camera trajectories are not possible using the typical UAV cable cam systems as these types of cinematic shots are complex to execute and typically require two or more human operators with remote controls. These typical UAV cable cam features do not dynamically adjust traversal speed, resulting in poor and unsafe trajectory tracking and/or an over-constrained maximum speed for the entire trajectory.

SUMMARY

This disclosure describes systems and methods for a multipoint cable cam (MPCC) of an aerial vehicle such as a UAV. A method includes operations of receiving user input associated with a predetermined drone path and correlating the received user input with stored global positioning satellite (GPS) data to generate one or more virtual waypoints along the predetermined path. The predetermined path may be a drone path and/or a camera path, whereby the drone path is the path set by the user for the drone to follow, and the camera path is the path set by the user for the camera to follow. The user input may include a touch-based input by a user using a touchscreen, for example drawing or tracing a path on a map. The method further includes processing the one or more virtual waypoints to generate a spline-based flight path. The number of virtual waypoints may be unlimited. The method may include storing the spline-based flight path and transmitting the spline-based flight path to the UAV.

A method may include receiving a flight path associated with a drone path and a camera path. The method may cause the device to fly in accordance with the received flight path. The method may include monitoring a visual landmark and correlating the visual landmark to a landmark in the stored GPS data. The correlating may be based on a comparison of the GPS information of the landmark in the stored GPS data with the current GPS position of the UAV relative to the visual landmark. The method may include determining whether the visual landmark matches the landmark stored in the GPS data. If the visual landmark does not match the landmark stored in the GPS data, the method may update the flight path based on the visual landmark.

The method may include adjusting an angle of a movement mechanism on the UAV. The movement mechanism may be configured to hold an imaging device. The angle of the movement mechanism may be based on the distance between the drone path and the camera path. The angle of the movement mechanism may be adjusted such that the angle decreases relative to a horizon as the distance between the drone path and the camera path increases.

This disclosure describes a method of controlling an unmanned aerial vehicle (UAV). The steps of controlling include acquiring images with an image capture device of an unmanned aerial vehicle (UAV). The steps include analyzing the images to determine navigation information of the UAV with a vision-based navigation system. The steps include tracking a position of the UAV with the vision-based navigation system. The steps include controlling rotors of the UAV to prevent deviations in movement from a desired flight path or position of the UAV. The steps include limiting travel or flight of the UAV to a physical region determined by the desired flight path.

The present teachings provide a method of controlling an unmanned aerial vehicle (UAV). Generating waypoints associated with a UAV. Creating a flight trajectory based upon user-defined keyframes. Recording keyframes of the user-defined keyframes. Recording images as the UAV travels between the waypoints. Generating a virtual cable that is smooth and continuous by stitching a position of the UAV and the keyframes in an order that were defined by the user-defined keyframes so that smooth, continuous, cinematic footage is recorded. The present teachings provide a method of controlling an unmanned aerial vehicle (UAV). Generating waypoints based upon stored GPS data. Generating a flight path based upon the waypoints. Storing the flight path. Transmitting the flight path to a UAV. Flying the UAV along the flight path. Capturing images or videos at the waypoints to generate captured images.

A device includes a receiver configured to receive user input associated with a predetermined path. The device may include a processor configured to correlate the received user input with stored GPS data to generate one or more virtual waypoints along the predetermined path. The processor may use the one or more virtual waypoints to generate a spline-based flight path. The device may include a memory for storing the spline-based flight path. The device may include a transmitter configured to transmit the spline-based flight path to the UAV.

A device may include a receiver configured to receive a flight path associated with a drone path and a camera path. The device is configured to fly in accordance with the received flight path. The device may include a processor and an imaging device configured to monitor a visual landmark and correlate the visual landmark to a landmark in the stored GPS data. The processor may correlate the data based on a comparison of the GPS information of the landmark in the stored GPS data with the current GPS position of the UAV relative to the visual landmark. The processor may be configured to determine whether the visual landmark matches the landmark stored in the GPS data. If the visual landmark does not match the landmark stored in the GPS data, the processor may update the flight path based on the visual landmark.

The device may include a movement mechanism that is configured to adjust an angle of an imaging device. The adjustment of the angle of the movement mechanism may be based on the distance between the drone path and the camera path. The angle of the movement mechanism may be adjusted such that the angle decreases relative to a horizon as the distance between the drone path and the camera path increases.

BRIEF DESCRIPTION OF THE DRAWINGS

The disclosed embodiments have other advantages and features that will be more readily apparent from the detailed description, the appended claims, and the accompanying figures. A brief introduction of the figures is below.

DETAILED DESCRIPTION

As discussed in further detail below, the present disclosure is directed to a multipoint cable cam system (MPCC) and method (e.g., process) for a UAV, which provides smooth camera transitions between user set keyframes while maintaining a safe cable traversal speed, regardless of the trajectory geometry generated by the user-set keyframes. More particularly, the MPCC system and method provide smooth, continuous, cinematic footage while dynamically limiting traversal speed based on UAV limitations.

The present technology will now be described in detail with reference to the drawings that are provided as illustrative examples to enable those skilled in the art to practice the technology. The figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

Figure 1C:
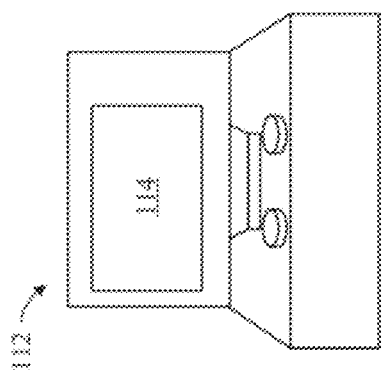
FIG. 1C shows an example remote controller and user interface for use with the UAV.
Figure 1B:
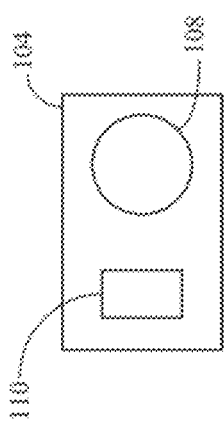
FIG. 1B shows an example imaging device associated with the UAV.
Figure 1A:
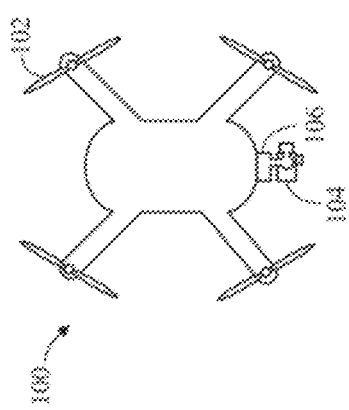
FIG. 1A shows an example of a UAV.

FIG. 1A shows an example of a UAV 100. In this embodiment, the UAV 100 has a quad-copter configuration, that is, the UAV 100 includes four rotors 102. Each rotor 102 is driven by a separate electric motor (not shown). However, the UAV 100 may be any form of an aerial vehicle. A battery pack (not shown) mounted on or in a body of the UAV 100 may supply electrical power to all four electric motors, flight electronics (not shown) associated with operation of UAV 100, and an imaging device 104 that provides still and video images by means of a communication link (not shown) to a ground-based user. The imaging device 104 may be coupled to a front of the UAV 100 using, for example, a movement mechanism 106.

In FIG. 1A, the movement mechanism 106 removably mounts the imaging device 104 to the UAV 100. The implementation of the movement mechanism 106 shown in this example is a three-axis gimbal that permits the imaging device 104 to be rotated about three independent axes. However, the movement mechanism 106 may include any type of translational and/or rotational elements that permit rotational and/or translational movement in one, two, or three dimensions of the imaging device 104 in respect to the UAV 100.

FIG. 1B shows an example of the imaging device 104 associated with the UAV 100. In FIG. 1B, the imaging device 104 is a GoPro Hero4® or Hero5® camera, however any type of imaging device 104 that can be coupled to the UAV 100, for example, through use of the movement mechanism 106, may be utilized. The imaging device 104 may include still image and video capture capabilities. FIG. 1B shows a lens 108 of the imaging device 104 and a display screen 110 associated with the imaging device 104. Means for coupling the imaging device 104 to the UAV 100 and/or the movement mechanism 106 are not shown.

FIG. 1C shows an example of a remote controller 112 including a user interface 114 for operating the UAV 100. The remote controller 112 may include a communications interface (not shown) via which the remote controller 112 may receive and send commands related to operation of the UAV 100, the imaging device 104, and the movement mechanism 106. The commands can include movement commands, configuration commands, operational control commands, and imaging commands. In some implementations, the remote controller 112 may be a smartphone, a tablet computer, a phablet, a smart watch, a portable computer, virtual reality (VR) device and/or another device configured to receive user input and communicate information with the imaging device 104, the movement mechanism 106, and/or the UAV 100.

For example, flight direction, attitude, and altitude of the UAV 100 may all be controlled by controlling speeds of the motors that drive the respective rotors 102 of the UAV 100. During flight, a GPS receiver on the UAV 100 may provide navigational data to the remote controller 112 for use in determining flight paths and displaying current location through the user interface 114. A MPCC system may also be implemented that tracks visually significant features through image data captured by the imaging device 104 to provide the necessary speed and position of the UAV 100 to the remote controller 112. The MPCC system may, for example, be used to control movement of the UAV 100 in a predictable manner along a user-defined path while preventing unintended movement of the UAV 100 (e.g., lateral drifting and/or tilting).

The communications interface may utilize any wireless interface configuration, e.g., Wi-Fi, Bluetooth (BT), cellular data link, ZigBee, near field communications (NFC) link, e.g., using ISO/IEC 14443 protocol, ANT+ link, and/or other wireless communications link. In some implementations, the communications interface may be effectuated using a wired interface, e.g., HDMI, USB, digital video interface, display port interface (e.g., digital display interface developed by the Video Electronics Standards Association (VESA), Ethernet, Thunderbolt), and/or other interface.

The remote controller 112 may operate a software application (e.g., GoPro Studio®, GoPro App®, and/or other application) configured to perform a variety of operations related to camera configuration, positioning of the movement mechanism 106, control of video acquisition, and/or display of video captured by the imaging device 104 through the user interface 114. An application (e.g., GoPro App)® may enable a user to create short video clips and share video clips to a cloud service (e.g., Instagram®, Facebook®, YouTube®, Dropbox®); perform full remote control of functions of the imaging device 104; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 104 and/or displaying the captured information.

Figure 2:
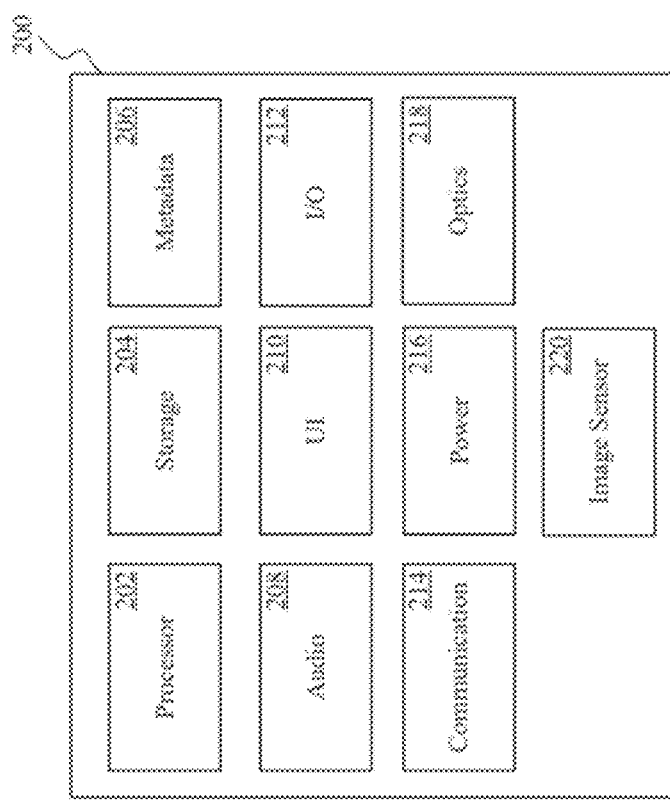
FIG. 2 is a block diagram illustrating components of a computing device.

FIG. 2 is a block diagram illustrating components of a computing device 200. The computing device 200 may be a single component of the UAV 100, the imaging device 104, the movement mechanism 106, or the remote controller 112. The computing device 200 may be multiple computing devices distributed in various ways between the UAV 100, the imaging device 104, the movement mechanism 106, or the remote controller 112. In the examples described, the computing device 200 may provide communication and control functions to the various components described in FIGS. 1A, 1B, and 1C.

The computing device 200 may include a processor 202. The processor 202 may include a system on a chip (SOC), microcontroller, microprocessor, CPU, DSP, ASIC, GPU, or other processors that control the operation and functionality of the UAV 100, the imaging device 104, the movement mechanism 106, and/or the remote controller 112. The processor 202 may interface with mechanical, electrical, sensory, and power modules via driver interfaces and software abstraction layers. Additional processing and memory capacity may be used to support these processes. These components may be fully controlled by the processor 202. In some implementations, one or more components may be operable by one or more other control processes (e.g., a GPS receiver may include a processing apparatus configured to provide position and motion information to the processor 202 in accordance with a given schedule (e.g., values of latitude, longitude, and elevation at 10 Hz.))

The computing device 200 may also include electronic storage 204 in which configuration parameters, image data, and/or code for functional algorithms may be stored. The electronic storage 204 may include a system memory module that is configured to store executable computer instructions that, when executed by the processor 202, control various functions of the UAV 100, the imaging device 104, the movement mechanism 106, and/or the remote controller 112. The electronic storage 204 may also include storage memory configured to store content (e.g., metadata, frames, video, and audio) captured by the imaging device 104 or sensors associated with the UAV 100, the movement mechanism 106, and/or the remote controller 112.

The electronic storage 204 may include non-transitory memory configured to store configuration information and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture. Additional electronic storage 204 may be available for other hardware, firmware, or software needs of the UAV 100, the imaging device 104, the movement mechanism 106, and/or the remote controller 112. The memory and processing capacity may aid in management of processing configuration (e.g., loading, replacement) operations during a startup and/or other operations.

The computing device 200 may also include optics 218, which may include the lens 108 (see FIG. 1B) as an optical element of the imaging device 104. In some implementations, the lens 108 may be a fisheye lens that produces images having a fisheye or near-fisheye field of view (FOV). Other types of optics 218 may also be utilized such as a standard lens, macro lens, zoom lens, special-purpose lens, telephoto lens, prime lens, achromatic lens, apochromatic lens, process lens, wide-angle lens, ultra-wide-angle lens, infrared lens, ultraviolet lens, perspective control lens, other lens, and other optical element. In some implementations, the optics 218 may implement focus controller functionality configured to control the operation and configuration of the camera lens. The optics 218 may receive light from an object and transmit received light to an image sensor 220.

The imaging device 104 may include one or more image sensors 220 such as a charge-coupled device (CCD) sensor, active pixel sensor (APS), complementary metal-oxide semiconductor (CMOS) sensor, N-type metal-oxide-semiconductor (NMOS) sensor, and other image sensor. The image sensor 220 may be configured to capture light waves gathered by the optics 218 and generate image data based on control signals from a sensor controller 222. The image sensor 220 may be configured to generate a first output signal conveying first visual information regarding an object. The visual information may include one or more of an image, a video, and other visual information. The optics 218 and the image sensor 220 may be contained within a housing, which may offer impact protection to the module and the sensor.

The computing device 200 may include or be in communication with metadata sources 206. The metadata sources 206 may include sensors associated with the UAV 100, the imaging device 104, and/or the movement mechanism 106. The sensors may include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor), and/or other sensors. The imaging device 104 may also provide metadata sources 206, e.g., image sensors, a battery monitor, storage parameters, and other information related to camera operation and capture of content. The metadata sources 206 may obtain information related to an environment of the UAV 100 and aspects in which the content is captured.

By way of a non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The metadata sources 206 may be rigidly coupled to the UAV 100, the imaging device 104, the movement mechanism 106, and/or the remote controller 112 such that the processor 202 may be operable to synchronize various types of information received from various types of metadata sources 206.

For example, using timing information, metadata information may be related to content (frame or video) captured by an image sensor. In some implementations, the metadata capture may be decoupled from the video or frame capture. That is, metadata may be stored before, after, and in-between one or more video clips or frames. In one or more implementations, the processor 202 may perform operations on the received metadata to generate additional metadata information. For example, the processor 202 may integrate received acceleration information to determine a velocity profile of the imaging device 104 during a recording of a video.

The computing device 200 may include or be in communication with audio sources 208, such as one or more microphones, configured to provide audio information that may be associated with images acquired by the imaging device 104 or commands provided by the remote controller 112. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codec.) In one or more implementations of spherical video and audio, the audio codec may include a 3-dimensional audio codec. For example, an Ambisonics codec can produce full surround audio including a height dimension. Using a G-format Ambisonics codec, a special decoder may not be required.

The computing device 200 may include or be in communication with a user interface (UI) 210. The UI 210 may include a display configured to provide information related to operation modes (e.g., camera modes, flight modes), connection status (e.g., connected, wireless, wired), power modes (e.g., standby, sensor, video), metadata sources 206 (e.g., heart rate, GPS, barometric), and/or other information associated with the UAV 100, the imaging device 104, the movement mechanism 106, and/or the remote controller 112. In some implementations, the UI 210 may include virtually any device capable of registering inputs from and communicating outputs to a user. These may include, without limitation, display, touch, gesture, proximity, light, sound receiving/emitting, wired/wireless, and/or other input/output devices. The UI 210 may include a display, one or more tactile elements (e.g., joysticks, switches, buttons, and/or virtual touch screen buttons), lights (LED), speaker, and/or other interface elements.

The UI 210 may be configured to enable the user to provide commands to the UAV 100, the imaging device 104, and/or the movement mechanism 106. For example, the user interface 114 shown in FIG. 1C is one example of the UI 210. User commands provided using the UI 210 may be encoded using a variety of approaches, including but not limited to duration of a button press (pulse width modulation), number of button presses (pulse code modulation), or a combination thereof. For example, two short button presses through the UI 210 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 200 may include an input/output (I/O) module 212. The I/O module 212 may be configured to synchronize the imaging device 104 with the remote controller 112, a second capture device, a smartphone, and/or a video server. The I/O module 212 may be configured to communicate information to and from various I/O components. The I/O module 212 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 212 may interface with LED lights, a display, a button, a microphone, speakers, and other I/O components. In one or more implementations, the I/O module 212 may be coupled to an energy source such as a battery or other DC electrical source.

The computing device 200 may include a communication module 214 coupled to the I/O module 212. The communication module 214 may include a component (e.g., a dongle) having an infrared sensor, a radio frequency transceiver and antenna, an ultrasonic transducer, and/or other communications interfaces used to send and receive wireless communication signals. In some implementations, the communication module 214 may include a local (e.g., Bluetooth, Wi-Fi) or broad range (e.g., cellular LTE) communications interface configured to enable communications between the UAV 100, the imaging device 104, the movement mechanism 106, and/or the remote controller 112.

The communication module 214 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, the communication module 214 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 214 may be represented using formats including one or more of hypertext markup language (HTML), extensible markup language (XML), and/or other formats. One or more exchanges of information between the imaging device 104 and outside devices, such as the remote controller 112, may be encrypted using encryption technologies including one or more of secure sockets layer (SSL), transport layer security (TLS), virtual private networks (VPNs), Internet Protocol security (IPsec), and/or other encryption technologies.

The computing device 200 may include a power system 216 that may moderate a power supply based on the needs of the UAV 100, the imaging device 104, the movement mechanism 106, and/or the remote controller 112. For example, a battery, solar cell, inductive (contactless) power source, rectification, or other power supply housed within the UAV 100 may be controlled by the power system 216 to supply power for the imaging device 104 and/or the movement mechanism 106 when in a coupled state as shown in FIG. 1A.

The UAV 100 employs navigation information to implement a MPCC system. The MPCC system may also employ a vision-based navigation method (e.g., process) performed thereby, which analyze images to determine navigation information of the UAV 100. The navigation information may include current information of the UAV 100, such as position (e.g., stored GPS information and/or user-defined path), velocity (e.g., translational velocity), orientation, and orientation rate (e.g., angular velocity). The stored GPS information may include publicly available GPS data from sources such as Google Maps, Google Earth, Apple Maps, Yahoo Maps, and the like. The MPCC system may, for example, be used to control movement of the UAV 100 in a predictable manner along a user-defined path while preventing unintended movement of the UAV 100 (e.g., lateral drifting and/or tilting). The MPCC system and/or vision-based navigation system may be used to track the position of the UAV 100 and operate the rotors 102 to prevent deviations in movement from a desired flight path or position of the UAV 100.

Use of the vision-based navigation system may be advantageous, for example, when a GPS system of the UAV 100 is inoperable or unreliable (e.g., in an indoor environment), the UAV 100 does not include a GPS system, or the stored GPS information is outdated. The MPCC system and the method are additionally configured to limit (e.g., confine, bound, redirect, and/or restrict) travel or flight of the UAV 100 to physical regions (e.g., a flight path) determined by a user-defined input. In the discussion that follows, the MPCC system and the MPCC method employed thereby may generally be referred to more simply as the system or the method (e.g., process), respectively.

Typical cable cam features do not provide smooth, continuous, cinematic footage and merely perform sequential waypoint-to-waypoint missions with discontinuous linear tweening between keyframes. These typical cable cam features do not dynamically adjust traversal speed, resulting in poor and unsafe trajectory tracking and/or an over-constrained maximum speed for the entire trajectory.

The MPCC system and method disclosed herein allows a single user to easily setup and fly 5-axis flight and camera trajectories for UAVs. These types of cinematic shots are complex to execute and typically require two or more human operators with remote controls. The MPCC system and method smoothly blends camera transitions between user set keyframes while constantly maintaining a safe cable traversal speed, regardless of the trajectory geometry generated by the user set keyframes.

In one embodiment, a user may manually fly UAV 100 to one or more waypoint locations and set keyframes of the target subject material. At each waypoint, the user can define the camera angle, yaw angle of the UAV 100, and gimbal tilt. The waypoint GPS position and altitude are recorded at each waypoint location. Once all the waypoints are defined and marked, the user may activate an autonomous flight by indicating three or more waypoints to generate the desired flight trajectory. The MPCC system then creates a flight trajectory based on the user-defined keyframes to generate a smooth, continuous virtual cable by stitching the position and camera poses of the keyframes in the order they were recorded by the user. The MPCC system may generate a spline, such as a Catmull-Rom spline, that acts as the spline-based flight path (i.e., flight trajectory), as well as the spline-based camera path (i.e., camera easing trajectory), during the autonomous traversal of the virtual cable. The spline is generated to smooth corners such that all points are on a curve, and the curvature may vary by segment.

The MPCC system may use a speed profile algorithm to continuously evaluate the user commanded speed and upcoming trajectory curvature to dynamically adapt trajectory speed to ensure that the trajectory adheres to the kinetic constraints of the UAV 100. The speed profile algorithm calculates the maximum look-ahead distance based on the current speed of the UAV 100 and then evaluates the curvature along the trajectory based on the calculated maximum look-ahead distance. The trajectory curvature is translated to a maximum allowable speed using, for example, a Frenet-Serret curvature and preset maximum accelerations for the UAV 100.

In another embodiment, the user may mark one or more paths on a topographic map using a touch-sensitive screen. One path may be a drone path that uses stored GPS locations from the topographic map to be followed by the UAV 100. Another path may be a camera path on which the imaging device 104 focuses on and is used in conjunction with the drone path to determine the camera angle, yaw angle of the UAV, and gimbal tilt.

In some situations, the satellite map information on the topographic map may not be accurate or up to date. In these situations, the UAV 100 may use a vision-based navigation system (e.g., computer vision) to recognize a path, trail, road, waterway, building, or any other geographic element to determine the flight trajectory and dynamically update the flight trajectory and adjust the position of the UAV 100.

The MPCC system disclosed herein generally includes the imaging device 104 and the computing device 200, which cooperatively perform the vision-based navigation method. The vision-based navigation system may additionally include, receive inputs from, and/or provide outputs to other components or systems, such as the rotors 102, the movement mechanism 106, the remote controller 112, the metadata sources 206, or other components described previously. Components of the MPCC system are preferably located onboard the UAV 100 and/or remote controller 112, but may include components and/or perform functions at other locations.

Figure 3:
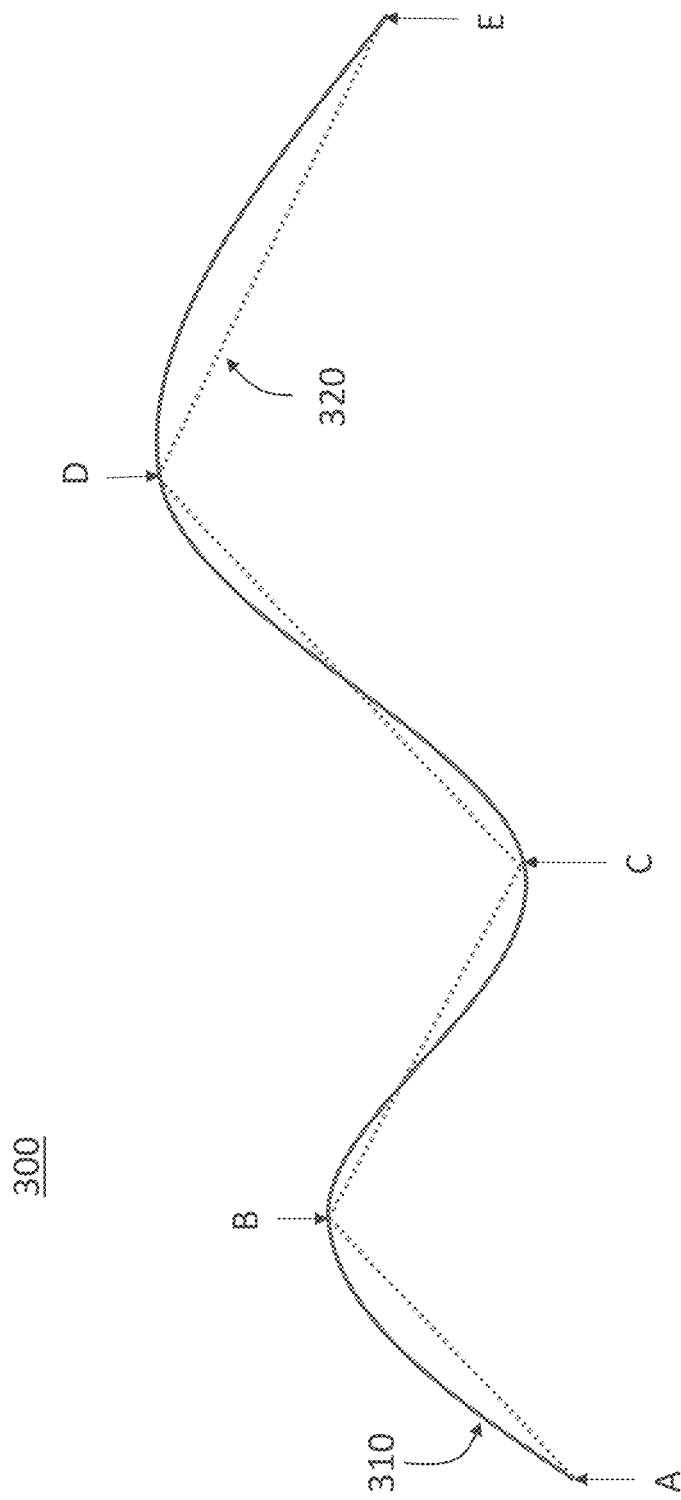
FIG. 3 is a diagram of an example flight path using an embodiment of the multipoint cable cam (MPCC) system.

FIG. 3 is a diagram of an example flight path 300 using an embodiment of the MPCC system. Referring to FIG. 3, an MPCC flight path 310 is shown in comparison with a typical flight path 320 of a legacy cable cam system. As shown in FIG. 3, a UAV follows the MPCC flight path 310 from points A to B, B to C, C to D, and D to E in a smooth and continuous manner. By way of contrast, the typical flight path 320 of the legacy cable cam system is subject to abrupt transitions when traveling from points A to B, B to C, C to D, and D to E.

Figure 4:
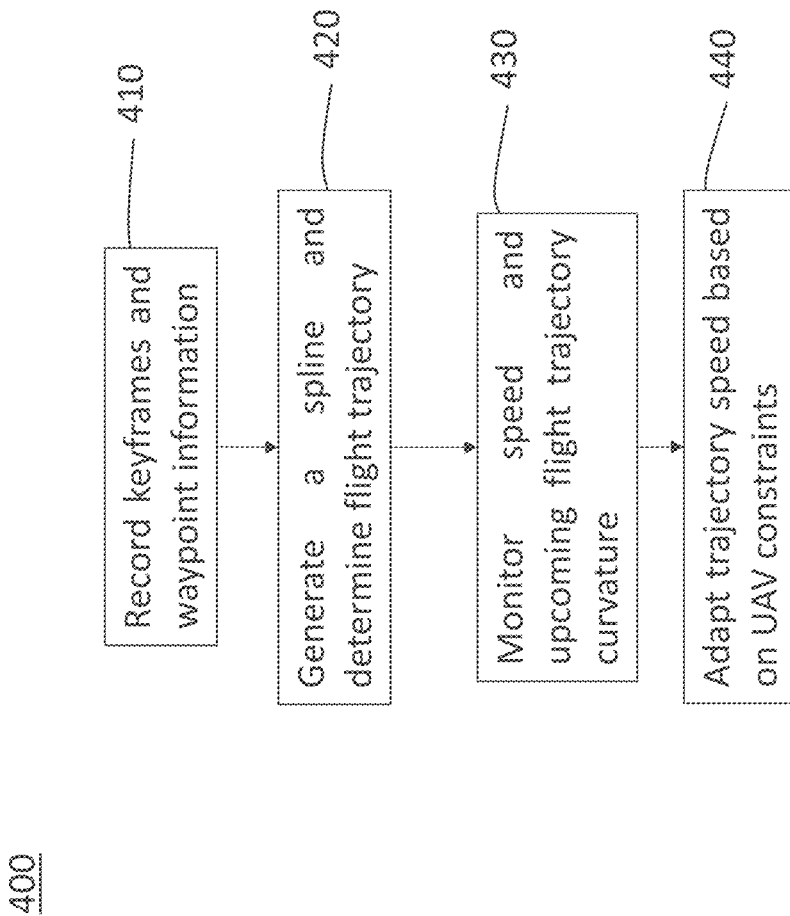
FIG. 4 is a flowchart illustrating an operation of the MPCC system of FIG. 3.

FIG. 4 is a flowchart illustrating an operation of the MPCC system of FIG. 3. Referring to FIG. 4, a user may manually fly UAV 100 to one or more waypoint locations and set keyframes of the target subject material. At each waypoint, the user can define the camera angle, yaw angle of the UAV 100, and gimbal tilt. The UAV 100 records each keyframe set by the user and the waypoint information 410. The waypoint information may include GPS position and altitude for each waypoint location. The MPCC system generates a spline and determines a flight trajectory 420 based on the user-defined waypoints. The MPCC creates a smooth and continuous virtual cable by stitching the position and camera poses of the keyframes in the order they were recorded by the user. The MPCC system may generate the spline, such as a Catmull-Rom spline, to act as the flight trajectory, as well as the camera easing trajectory, during an autonomous traversal of the virtual cable. The spline is generated such that all points are on a curve, and the curvature may vary by segment. In addition to generating a spline between the different waypoints, the user may set the waypoints up at different altitudes and generate the spline taking into consideration the altitude at each of the waypoints.

The MPCC system monitors the speed of the UAV 100 and the upcoming flight trajectory curvature 430. The MPCC system may use a speed profile algorithm to continuously evaluate the user commanded speed and upcoming trajectory curvature to dynamically adapt trajectory speed 440 to ensure that the trajectory adheres to the kinetic constraints of the UAV 100. The speed profile algorithm calculates the maximum look-ahead distance based on the current speed of the UAV 100 and then evaluates the curvature along the trajectory based on the calculated maximum look-ahead distance. The trajectory curvature is translated to a maximum allowable speed using, for example, a Frenet-Serret curvature and preset maximum accelerations for the UAV 100 such as yaw rate, pitching rate, and tilt rate.

Figure 5:
FIG. 5 is a diagram of an example flight path based on user input on a topographical map.

FIG. 5 is a diagram of an example flight path based on user input on a topographical map 500. In this example, the user may create a virtual cable, i.e. a flight path, for the UAV 100 to follow without performing an initial flight and setting up manual waypoints during the initial flight. This may result in operation efficiency, improved battery life, and enhanced flight control. The topographical map 500 includes GPS information that may be stored in UAV 100 an/or remote controller 112.

The topographical map 500 may be obtained from publicly available GPS data from sources such as Google Maps, Google Earth, Apple Maps, Yahoo Maps, and the like, as well as non-public proprietary sources. The GPS data may be in a tile format, where each tile may represent an area on the topographical map 500. Each tile may represent a ten meter by ten meter area, for example. The GPS data includes latitude, longitude, elevation, and any relevant metadata representing buildings, waterways, roads, etc.

Referring to FIG. 5, the topographical map 500 includes mountainous terrain 510, a wooded area 520, and a road 530. A user may use the remote controller 112 to view and interact with the topographical map 500. The remote controller 112 may include a touchscreen to enable the user to draw a drone path 540 and a camera path 550. A visual trace of the user-defined drone path 540 and camera path 550 are displayed on the touchscreen of the remote controller 112. The user may use the touchscreen on the remote controller 112 to input altitude information. The altitude may be fixed prior to flight or manually adjusted during flight.

Figure 6:
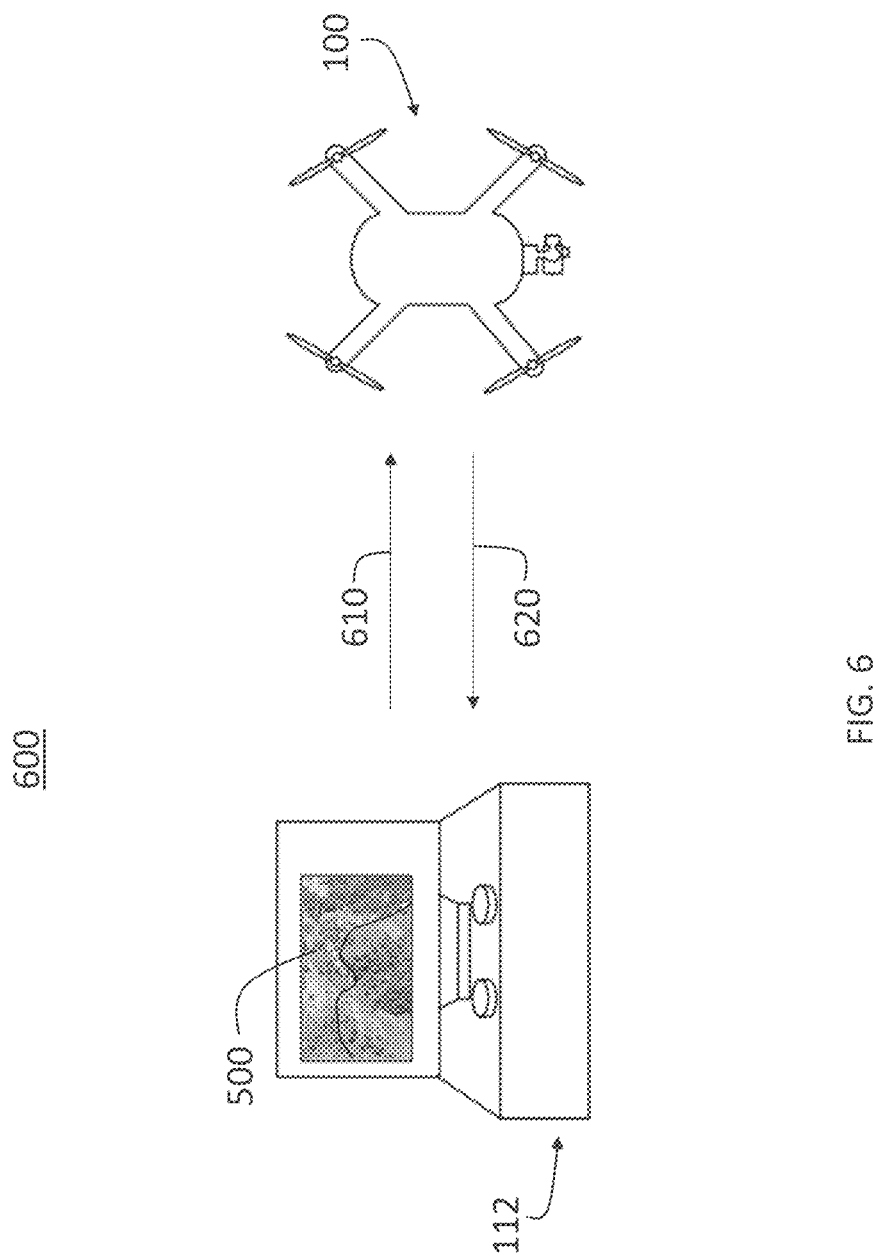
FIG. 6 is a signal flow diagram of the communication between the remote controller and the UAV.

FIG. 6 is a signal flow diagram 600 of the communication between the remote controller 112 and the UAV 100. The remote controller 112 includes a touchscreen on which the topographical map 500 is displayed. Once the user defines the drone path 540 and the camera path 550 using the touchscreen of the remote controller 112, the remote controller 112 transmits the map information 610 including the drone path 540, the camera path 550, and embedded map metadata to the UAV 100. The UAV 100 receives and processes the map information 610 to generate a virtual cable, i.e. a flight path. Alternatively, the remote controller processes the map information to generate a flight path and transmits the flight path to the UAV 100.

During flight, the UAV 100 transmits visual data 620 to the remote controller. The UAV 100 may visually monitor geographic elements such as trails, waterways, roads, bridges, mountains, buildings, etc. and determine whether the received map information 610 is accurate. If the received map data 610 is confirmed with the real-time visual data from the camera of the UAV 100, the UAV 100 will continue its predetermined flight path. If the received map information 610 is not accurate, the UAV 100 may dynamically adjust the flight path based on the real-time visual data. The adjusted flight path may be stored on the UAV 100 and/or it may be included in the visual data 620 and transmitted to the remote controller 112.

Figure 7:
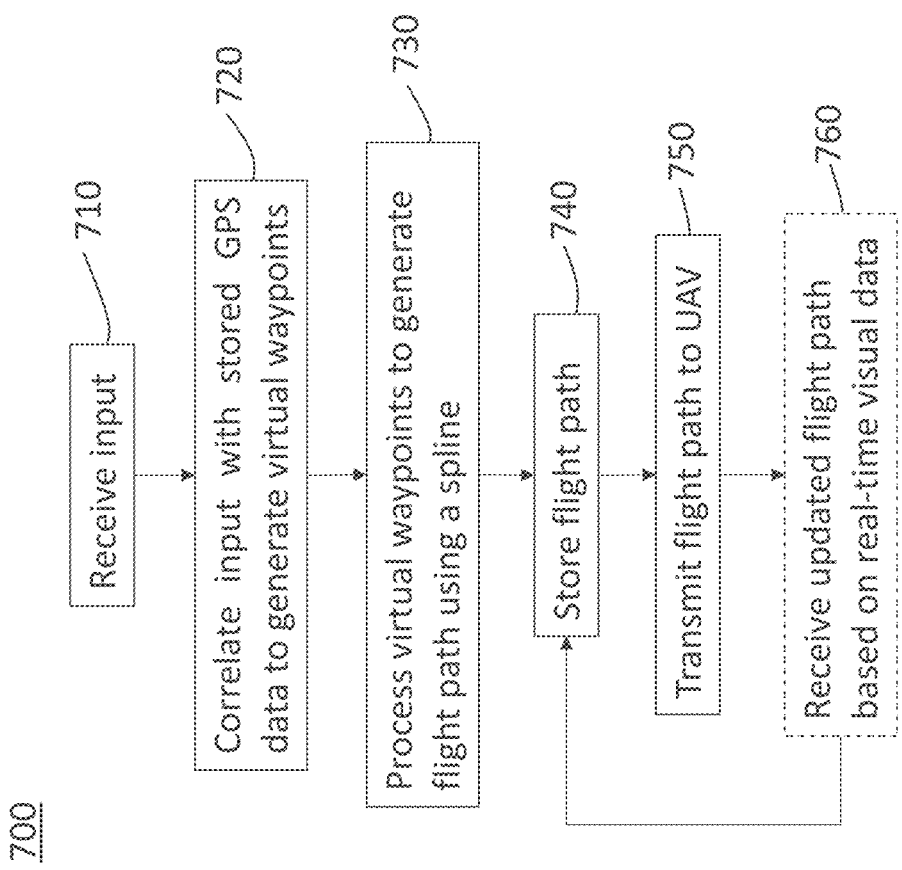
FIG. 7 is a flow chart illustrating an operation of the remote controller of the multipoint cable cam system.

FIG. 7 is a flow chart 700 illustrating an operation of the remote controller 112 of the MPCC system. Referring to FIG. 7, the remote controller 112 receives user input 710 via a touchscreen. The touchscreen may be part of the remote controller 112 or it may be a standalone device such as a smartphone or tablet that is in communication with the remote controller 112 and/or the UAV 100. The user input may include a drone path 540 and a camera path 550.

The remote controller 112 correlates the user input with stored GPS data to generate virtual waypoints 720. The virtual waypoints are generated along the drone path 540 as defined by the user. Each virtual waypoint includes at least a GPS position that includes latitude data, longitude data, elevation data, altitude data, and any relevant map metadata. The virtual waypoints are processed to generate a flight path using a spline 730 as described above. The flight path is then stored 740 and transmitted 750 to the UAV 100. The camera path 550 is processed in a similar manner to the drone path 540. If the MPCC determines that the real-time visual data does not match the stored map data, the remote controller 112 may receive an updated flight path from the UAV 100. It is noted that steps 720, 730, and 740 may be performed at the UAV 100.

Figure 8:
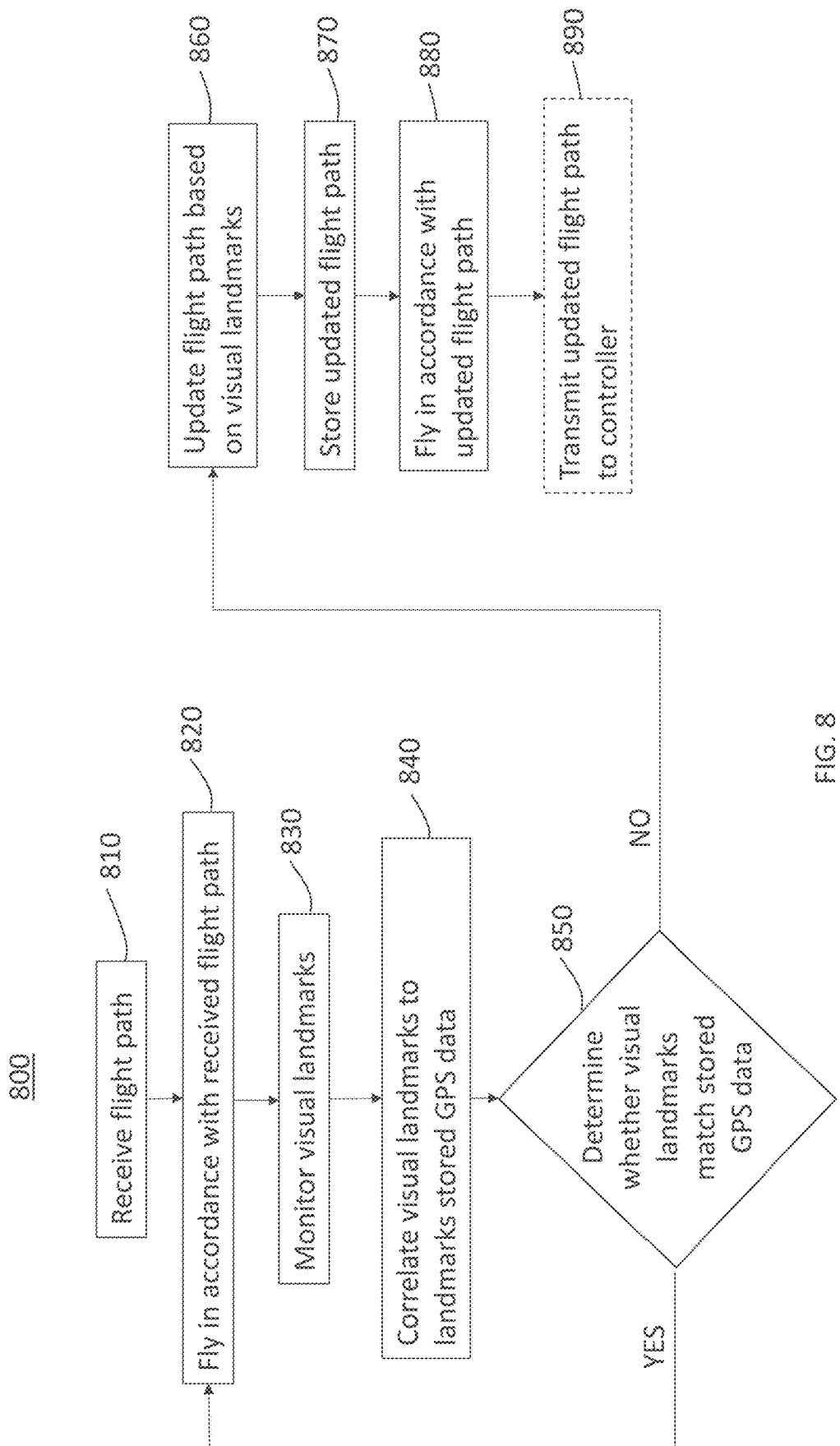
FIG. 8 is a flow chart illustrating an operation of a UAV of the MPCC system.

FIG. 8 is a flow chart 800 illustrating an operation of a UAV 100 of the MPCC system. Referring to FIG. 8, the UAV 100 receives a flight path 810 from a remote controller 112 or any other suitable device. The UAV 100 commences a predetermined (autonomous or semi-autonomous) flight in accordance with the received flight path 820. During the flight, the UAV 100 monitors visual landmarks 830 using an on-board imaging device 104, such as a camera. The UAV 100 correlates the visual landmarks to landmarks in the stored GPS data 840. This correlation is based on a comparison of the GPS information of the landmark in the stored GPS data with the current GPS position of the UAV 100 relative to the visual landmark. The UAV 100 then determines whether the visual landmarks match the stored GPS data 850. If the visual landmarks match the stored GPS data, the UAV 100 will continue its predetermined flight path. If the visual landmarks do not match the stored GPS data, the UAV 100 will update the flight path based on the visual landmarks 860 (i.e., real-time visual data). The updated flight path is then stored 870 and the flight continues in accordance with the updated flight path 880. In some instances, the updated flight path may be transmitted 890 to the remote controller 112. The visual landmarks may be used for obstacle avoidance, and the UAV 100 may transmit an alert to the remote controller 112 to inform the user of a potential obstacle interfering with the predetermined flight path. Alternatively, or in addition to transmitting the alert, the UAV 110 may adjust its position to avoid the potential obstacle.

Figure 9:
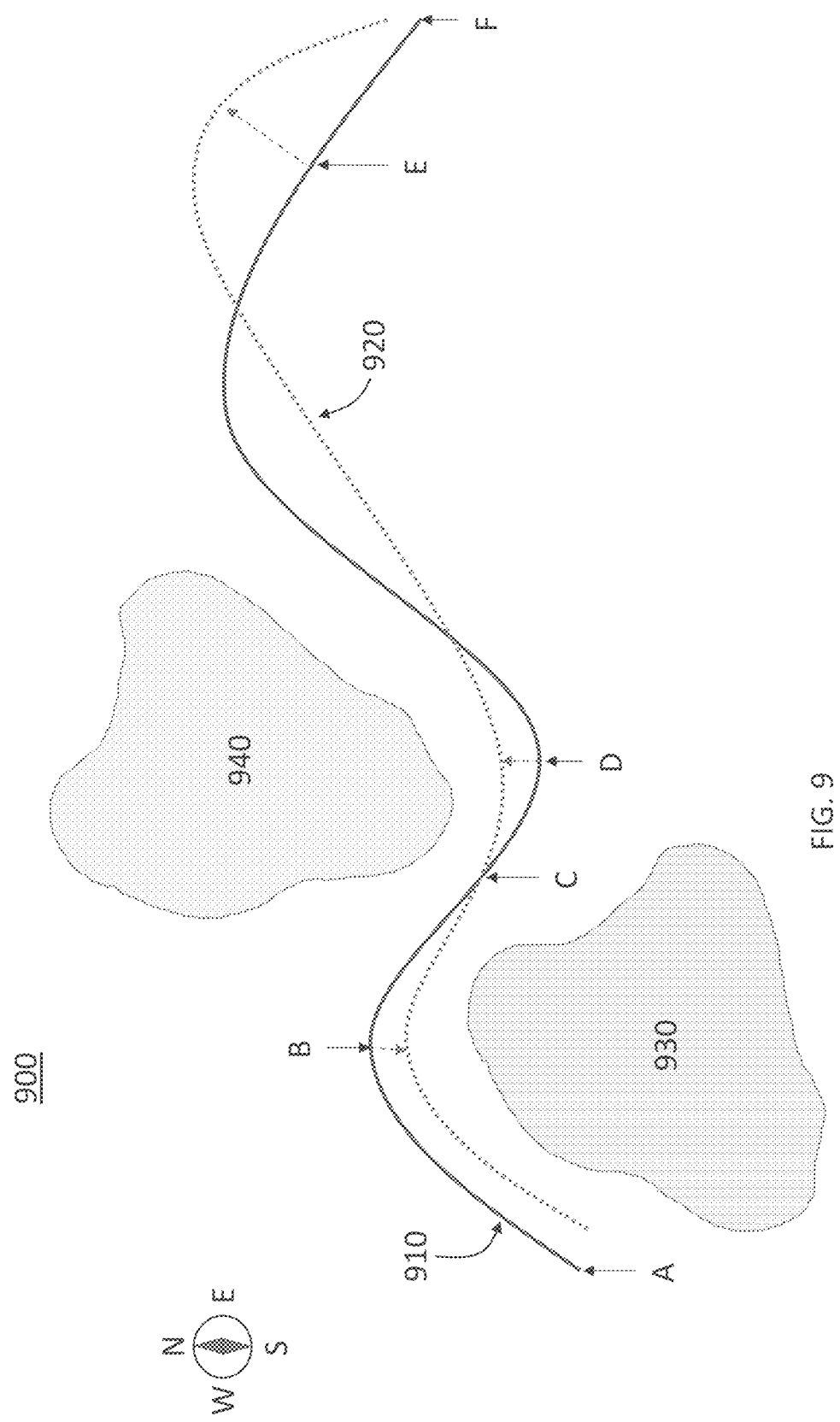
FIG. 9 is a diagram of an example flight path using an auto-panning embodiment of the MPCC system.

FIG. 9 is a diagram of an example flight path 900 using an auto-panning embodiment of the MPCC system. In this example, the auto-panning function refers to smoothing the motion of the yaw of the movement mechanism 106 (e.g. a three-axis gimbal) between two points.

Referring to FIG. 9, a drone path 910 and camera path 920 are shown traversing between mountain 930 and mountain 940. The starting point of the UAV 100 is point A and the ending point is point F. During the flight, the UAV 100 follows the drone path 910 and directs the imaging device 104 at the camera path 920. For example, at point B, the UAV 100 is directed to capture images and/or video of the north side of mountain 930. Similarly, at point D, the UAV 110 is directed to capture images and/or video of the south side of mountain 940.

The distance between the drone path 910 and camera path 920 at any given point determines the position of the movement mechanism 106. As the distance between the drone path 910 and camera path 920 increases, the angle of the movement mechanism 106 decreases relative to the horizon. For example, the angle of the movement mechanism 106 at point E will be much less than the angle of the movement mechanism 106 at points B and D. At the points where the drone path 910 and the camera path 920 intersect, for example, point C, the movement mechanism 106 is positioned at 90 degrees (i.e., directly downward and perpendicular to the horizon).

Where certain elements of these implementations may be partially or fully implemented using known components, only those portions of such known components that are necessary for an understanding of the present disclosure have been described. Detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the term "computing device" is meant to include personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor," and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v/ac/ad/ai/ay), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. A method, comprising:
   acquiring images with an image capture device of an unmanned aerial vehicle (UAV);
   analyzing the images to determine navigation information of the UAV with a vision-based navigation system;
   tracking a position of the UAV with the vision-based navigation system;
   controlling rotors of the UAV to prevent deviations in movement from a desired flight path or position of the UAV; and
   limiting travel or flight of the UAV to a physical region determined by the desired flight path.

2. The method of claim 1, wherein the navigation information of the UAV includes position, velocity, orientation, or orientation rate.

3. The method of claim 1, wherein the desired flight path is a flight path determined by a user-defined input.

4. The method of claim 1, further comprising:
   implementing the vision-based navigation system when a GPS system of the UAV is inoperable or unreliable.

5. The method of claim 4, wherein the GPS system includes stored GPS data that is obtained from a publicly available GPS data source.

6. The method of claim 1, further comprising:
   recognizing, with the vision-based navigation system, a path, trail, road, waterway, building, or other geographic elements.

7. The method of claim 6, further comprising:
   dynamically updating a flight trajectory and the position of the UAV with the vision-based navigation system based upon the path, the trail, the road, the waterway, the building, or the other geographic elements recognized by the vision-based navigation system.

8. The method of claim 1, further comprising:
   providing inputs and outputs, with the vision-based navigation system, to the rotors, a movement mechanism, a remoter controller, or metadata sources.

9. A method, comprising:
   generating waypoints associated with an unmanned aerial vehicle (UAV);
   creating a flight trajectory based upon user-defined keyframes;
   recording keyframes of the user-defined keyframes;
   recording images as the UAV travels between the waypoints; and
   generating a virtual cable that is smooth and continuous by stitching a position of the UAV and the keyframes in an order that were defined by the user-defined keyframes so that smooth, continuous, cinematic footage is recorded.

10. The method of claim 9, further comprising:
    maintaining a safe cable traversal speed as the UAV travels along the virtual cable.

11. The method of claim 10, wherein the safe cable traversal speed is maintained regardless of a trajectory geometry generated by the user-defined keyframes.

12. The method of claim 9, further comprising:
    blending camera transitions between the user-defined keyframes.

13. The method of claim 9, wherein the keyframes are a target subject material.

14. The method of claim 13, comprising:
    generating a spline-based flight path and the flight trajectory of the UAV based upon the user-defined keyframes.

15. A method, comprising:
    generating waypoints based upon stored GPS data;
    generating a flight path based upon the waypoints;
    storing the flight path;
    transmitting the flight path to an unmanned aerial vehicle (UAV);
    flying the UAV along the flight path; and
    capturing images or videos at the waypoints to generate captured images.

16. The method of claim 15, wherein a software application performs operations comprising:
    positioning a movement mechanism of the UAV;
    controlling the capturing of the images or the videos; and/or
    displaying the captured images or the videos.

17. The method of claim 16, wherein the software application is located on a remote controller.

18. The method of claim 16, wherein the software application is configured to enable a user to create short video clips, perform full remote control of an imaging device of the UAV, or wirelessly control software of an image capture device.

19. The method of claim 16, wherein the software application is connected to a cloud service so that the software application is configured to upload the images or the video to the cloud service.

20. The method of claim 15, further comprising:
    smoothing corners at the waypoints so that a curvature is formed along segments between the waypoints.

* * * * *